United States Patent [19]

Anderson

[11] Patent Number: 5,063,318

[45] Date of Patent: Nov. 5, 1991

[54] PRELOADED PERMANENT MAGNET ROTOR ASSEMBLY

[75] Inventor: W. Kyle Anderson, Rockford, Ill.

[73] Assignee: Sundstrand Corporation, Rockford, Ill.

[21] Appl. No.: 398,453

[22] Filed: Aug. 25, 1989

[51] Int. Cl.[5] .................. H02K 21/12; H02K 1/00; H02K 1/22

[52] U.S. Cl. .................. 310/156; 310/216; 310/262

[58] Field of Search .............. 310/156, 214, 215, 216, 310/218, 262; 29/598

[56] References Cited

U.S. PATENT DOCUMENTS

| | | | |
|---|---|---|---|
| 1,555,065 | 9/1925 | Lindquist | 310/214 |
| 4,296,544 | 10/1981 | Brugmeier et al. | 29/598 |
| 4,302,693 | 11/1981 | Burgmeier et al. | 310/156 |
| 4,323,802 | 4/1982 | Leistner | 310/59 |
| 4,332,079 | 6/1982 | Silver | 29/598 |
| 4,339,874 | 7/1982 | McCarty et al. | 29/598 |
| 4,354,126 | 10/1982 | Yates | 310/156 |
| 4,417,168 | 11/1983 | Miller et al. | 310/156 |
| 4,464,596 | 8/1984 | Miller et al. | 310/156 |
| 4,588,914 | 5/1986 | Heyne | 310/156 |

FOREIGN PATENT DOCUMENTS 1359548 7/1974 United Kingdom ............... 310/156

Primary Examiner—Steven L. Stephan
Assistant Examiner—C. LaBalle
Attorney, Agent, or Firm—Wood, Phillips, Mason, Recktenwald & VanSanten

[57] ABSTRACT

The problem of preloading a rotor assembly (14) in a dynamoelectric machine (10) of the permanent magnet type is solved by providing a hub (20) having a plurality of outwardly opening, annularly spaced slots (22, 24). The slots are outwardly converging and separated by outwardly diverging partition portions (26) of the hub. A plurality of outwardly converging permanent magnets (30) respectively are disposed in the slots. A containment shell (32) surrounds the hub. Wedges (36) are inserted between the base of each permanent magnet and the bottom (24) of its respective slot for loading the permanent magnets radially outwardly toward the containment shell and against the sides of the slots, thereby to place the partition portions of the hub under tension in a static condition of the rotor assembly.

9 Claims, 2 Drawing Sheets

PRELOADED PERMANENT MAGNET ROTOR ASSEMBLY

FIELD OF THE INVENTION

This invention generally relates to dynamoelectric machines of the permanent magnet type and, particularly, to a rotor assembly for such machines in which the permanent magnets are preloaded.

BACKGROUND OF THE INVENTION

A dynamoelectric machine of the permanent magnet type, such as a permanent magnet generator, generally includes a rotor assembly rotatably mounted within a stationary outer stator. The rotor assembly includes a plurality of annularly spaced permanent magnets. Usually, the magnets are equally spaced and of an even number to provide alternating polarity magnetic means around the periphery of the rotor assembly. The stator usually includes windings arranged to magnetically couple with the rotor poles. During rotation of the rotor assembly, the flux of the permanent magnets induce an electromotive force in the stator coils.

When the permanent magnets are disposed around the radial periphery of the stator assembly, it is common to locate the permanent magnets in radially outwardly opening slots annularly spaced about a rotor hub. A containment shell surrounds the hub and the spaced permanent magnets. There is a continuing problem in designing such rotor assemblies, particularly in the design of the containment shell and involving the force parameters interacting between the components, including considerations of varying forces on the magnets and the hub portions between a static condition and high speed rotational conditions during operation of the dynamoelectric machine.

For instance, the hub of the rotor assembly may have outwardly diverging partition portions separating the permanent magnets, with the magnets being disposed in outwardly converging slots. It has been discovered that the typical design approach results in the root area between the hub slots being subjected to compressive forces, even during operation of the machine at high rotational speeds. This results in inefficient design parameters, particularly in the outer containment shell which often is overdesigned in its strength parameters or simply is made too thick. In aerospace applications, this results in excessive size and weight parameters which are critical in aerospace applications. With such outwardly diverging hub portions between the outwardly converging spaced slots, it would be ideal to somehow place the root areas of the hub portions under tension. Regardless of the slot configuration, it would be desirable to preload the permanent magnets in such a manner that the load is directed only in a radially outward direction toward the containment shell.

This invention is directed to solving the above problems and satisfying the stated needs by providing a preloading system which enables the containment shell to be designed with lower strength requirements and/or thinner dimensions than has been heretofore affordable.

SUMMARY OF THE INVENTION

An object, therefore, of the invention is to provide a new and improved preloaded rotor assembly for use in a dynamoelectric machine of the permanent magnet type.

In the exemplary embodiment of the invention, the rotor assembly includes a hub having a plurality of outwardly converging, annularly spaced slots separated by outwardly diverging partition portions of the hub. A plurality of outwardly converging permanent magnets are disposed respectively in the slots. A containment shell surrounds the hub. Wedge means are provided between the base of each permanent magnet and the bottom of its respective slot for loading the permanent magnets outwardly toward the containment shell and against the sides of the slots, thereby to place the partition portions of the hub under tension in a static condition of the rotor assembly.

Regardless of the configuration of the hub slots and its separating partition portions, by placing the wedge means between the base of each permanent magnet and the bottom of its respective slot, only radially outwardly preload forces are effected toward the containment shell.

The wedge means are shown herein in the form of at least one wedge-shaped member positionable at the base of each permanent magnet in a direction axially of the rotor assembly. Preferably, at least a pair of such wedge-shaped members are positionable in juxtaposition in oppositely oriented directions axially of the rotor assembly.

The invention contemplates a feature wherein the wedge-shaped members may have a length greater than the axial dimension of the hub. Therefore, exposed ends of the wedge members can be severed once a desired biasing load has been applied to the permanent magnets.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
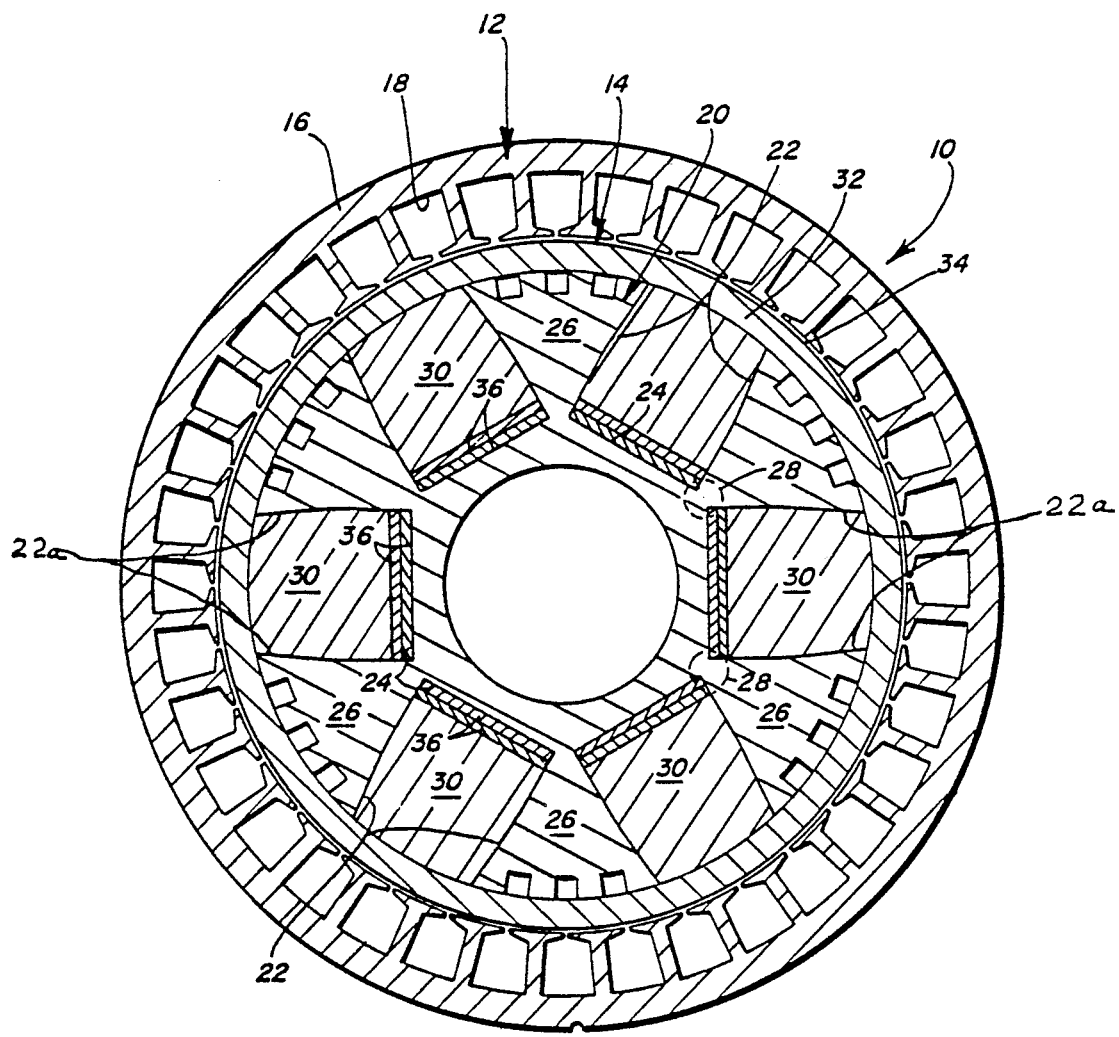
FIG. 1 is a radial section through a dynamoelectric machine incorporating a preloaded rotor assembly embodying the concepts of the invention.

Referring to the drawings in greater detail, and first to FIG. 1, the basic components of a dynamoelectric machine, generally designated 10, of the permanent magnet type, are generally shown. Specifically, such a permanent magnet machine includes a stationary outer stator assembly, generally designated 12, and an inner rotatable rotor assembly, generally designated 14.

Stator assembly 12 is generally conventional and includes a cylindrical housing 16 having a plurality of axially extending, radially spaced slots 18 within which a number of windings (not shown) are arranged to magnetically couple with the poles of rotor assembly 14.

During rotation of rotor assembly 14, a varying flux linkage is created between the permanent magnets (described below) and the stator coils, inducing an electromotive force in each of the coils. Of course, this general operation of such a dynamoelectric machine, such as a permanent magnet generator, is well known.

Figure 2:
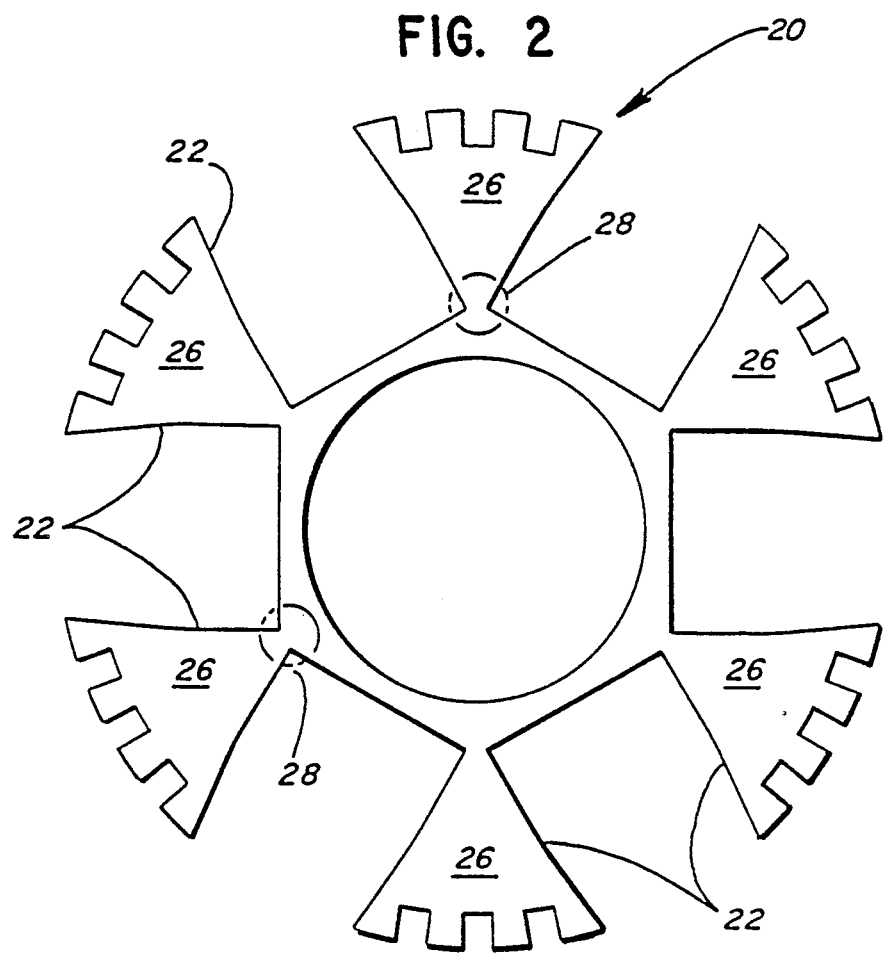
FIG. 2 is a radial section through the hub component of the rotor assembly.

Rotor assembly 14 includes a hub, generally designated 20 (also see FIG. 2), having a plurality of outwardly converging, annularly spaced slots defined by converging side walls 22 and bottom walls 24. The slots are separated by outwardly diverging partition portions 26 of the hub. It can be seen that each partition portion 26 terminates radially inwardly at a root area as indicated by circles 28.

A permanent magnet 30 is disposed in each slot of hub 20. It can be seen that the permanent magnets are shaped complementarily to the slots, i.e. each permanent magnet converges radially outwardly in a mating relationship with the converging side walls 22 of the slots.

A cylindrical containment shell 32 surrounds hub 20, contains permanent magnets 30 and defines an air gap 34 between rotor assembly 14 and stator assembly 12.

Generally, the invention contemplates means for preloading rotor assembly 14 by radially outwardly loading permanent magnets 30 to apply a radially outward bias against partition portions 26 of hub 20, with the bias preferably being only in a direction radially outwardly toward containment shell 32. More particularly, wedges 36 are forced in a direction axially of the rotor assembly between the base of each permanent magnet 30 and bottom wall 24 of its respective slot in hub 20. These wedges bias the permanent magnets radially outwardly toward containment shell 32 and are effective to place partition portions 26 of hub 20 under tension, such as at root areas 28.

As stated above, it has been discovered that the root areas 28 of partition portions 26 of hub 20, between the hub slots, are subjected to compressive forces by the containment shell, even during operation at high rotational speeds. This is what occurs with heretofore available rotor assemblies of the character described herein. These compressive loads are reduced somewhat at speed, but the shell loads increase with speed, resulting in shell stress cycles. At high speeds, centrifugal force tends to expand the containment shell, which is another design consideration to be met. Ideally, at maximum speed, all fibers in the hub and the containment shell should be helping to retain the permanent magnets.

In order to compensate for all of these various conditions, it has been conventional to take the easiest route and simply overdesign the containment shell either in its strength parameters or its size, i.e. thickness. The problem with this simple approach is that the weight and size of the machine is unnecessarily increased which, in aerospace applications, is quite undesirable. The invention recognizes a solution in which partition portions 26 of hub 20, particularly in the root areas 28 thereof, are placed under tension by preloading permanent magnets 30 in a radially outward direction. The immediate advantage to such a system is to allow the use of a containment shell that either is thinner in cross-section or lower in strength requirements than could be heretofore permitted. In essence, wedges 36 exert a radially outward load on permanent magnets 30 which, in turn, apply a radially outward load against inward tapered portions 22a of side walls 22 of the slots defined by the converging partition portions 26. The result of the action of wedges 36 is to apply a radial tension force on hub partition portions 26 at root areas 28.

As the rotor speed is increased during operation, centrifugal force will act upon permanent magnets 30 and reduce the radially outward force against the magnets provided by wedges 36. As the centrifugal force reduces the radially outward force provided by the wedges, because of the decrease in the force now exerted by the wedges, the net radially outward force against the containment shell will remain generally constant from a rest condition to a rotating condition. Shell loads can be preloaded to maximum stress, and therefore shell stress cycling can be eliminated. In essence, the preloading forces provided by the wedges which apply tensile forces at root areas 28, permit the use of a thinner containment shell 32 or, alternatively, a sleeve made from a material having a lesser strength. Obviously, this permits a more efficient rotor design. A designer can tailor the stress distribution of the hub and the shell in order to take maximum advantage of their material properties.

In fact, the wedges can be designed to actually cancel out the forces involved. In other words, once the centrifugal forces caused by the masses of the permanent magnets are calculated, the loading forces of the wedges can be matched therewith. For instance, if the centrifugal force is calculated to build up to "X" psi, by applying a radially outward loading force on the magnets of "X" psi, through wedges 36 as stated above the centrifugal force on the wedges reduces the force provided by the wedges. Therefore, the centrifugal force would cancel out the force applied by the wedges at maximum speed and, in essence, there would be a force direction shift with very minor movement of the components and, consequently, under some circumstances the containment shell could be eliminated.

Figure 3:
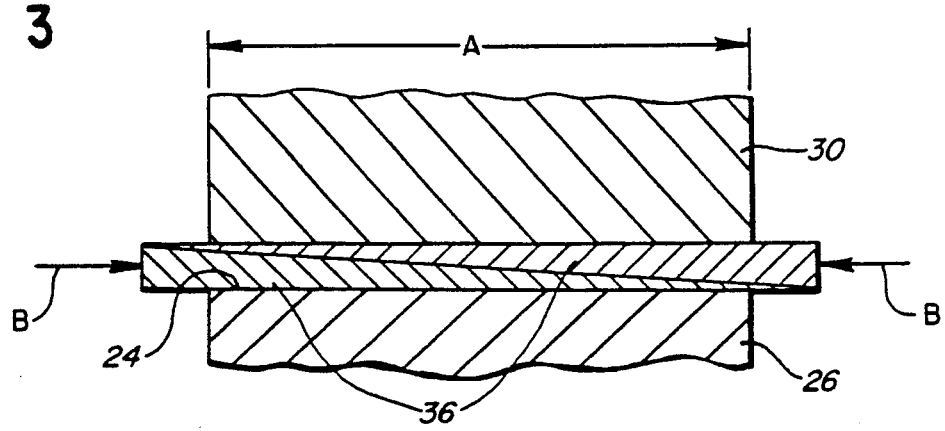
FIG. 3 is a section through a pair of oppositely directed, juxtaposed wedge members used to preload the permanent magnets.

To this end, FIG. 3 shows a concept wherein a pair of wedges 36 are positioned between the base of each permanent magnet 30 and bottom wall 24 of its respective slot. The wedges are in oppositely oriented directions axially of the rotor assembly. Arrow "A" indicates the axial dimension of rotor hub 26 and magnet 30. The wedges can be forced in opposite directions, in the direction of arrows "B", until a desired radially outward loading force is achieved. At this point, the protruding ends of the wedges can be severed. In other words, the wedges initially can be designed longer than the width of the rotor hub to provide for easily varying the biasing force.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In a dynamoelectric machine of the permanent magnet type, a rotor assembly comprising:

a hub having a plurality of outwardly converging annularly spaced slots separated by outwardly diverging partition portions of the hub, at least one said slot being defined by an outwardly facing bottom and circumferentially spaced sidewalls, said sidewalls converging in a radially outward direction only from a point spaced radially outwardly from the bottom;

a plurality of outwardly converging permanent magnets respectively disposed in the slots;

a containment shell surrounding the hub; and wedge means between a base of each permanent magnet and a bottom of its respective slot for loading the permanent magnets radially outwardly toward the containment shell and against sides of the slots to place the partition portions of the hub under tension at least in a static condition of the rotor assembly, said wedge means comprising first and second wedge-shaped members having spaced-apart ends with different thicknesses, each of said wedge-shaped members arranged in opposite juxtaposed relationship with the wedge members forcibly positioned in a direction axially of the rotor to bias one of the magnets radially outwardly toward the containment shell.

2. In a dynamoelectric machine as set forth in claim 1, wherein said wedge-shaped members are each solid to define a solid mass between the bottom of the slot and the one magnet.

3. In a dynamoelectric machine as set forth in claim 1, wherein said wedge means comprise at least a pair of wedge-shaped members having spaced-apart ends with different thicknesses, each of said pair of wedge-shaped members arranged in opposite juxtaposed relation, whereby said pair of oppositely oriented wedge members are forcibly positioned in a direction axially of the rotor assembly to bias the permanent magnets radially outwardly toward the containment shell.

4. In a dynamoelectric machine of the permanent magnet type, a rotor assembly comprising:

a hub having a plurality of outwardly converging annularly spaced slots separated by outwardly diverging partition portions integral with the hub, each partition portion having an associated root portion, each slot having an outwardly facing bottom;

a plurality of outwardly converging permanent magnets respectively disposed in the slots;

a containment shell surrounding the hub and adapted to subject the root portions to compressive force; and means for loading the permanent magnets only in a direction radially outwardly toward the containment shell and against sides of the slots to place the partition portions of the hub under tension at least in a static condition of the rotor assembly, said loading means comprising first and second wedge-shaped members having spaced-apart ends with different thicknesses, each of said wedges arranged in opposite juxtaposed relationship with the wedges being forcibly positioned in one of the slots in a direction axially of the rotor between the bottom of one of the slots and a magnet in the one slot, said wedge-shaped members being solid so that there is a solid mass between the bottom of the one slot and the magnet in the one slot.

5. In a dynamoelectric machine as set forth in claim 4, wherein said means for loading comprise at least one wedge-shaped member having spaced-apart ends with different thicknesses, whereby said wedge member is forcibly positioned in a direction axially of the rotor assembly to bias the permanent magnets radially outwardly toward the containment shell.

6. In a dynamoelectric machine as set forth in claim 4, wherein said means for loading comprise at least one wedge-shaped member having spaced-apart ends with different thicknesses, each of said pair of wedge-shaped members arranged in opposite juxtaposed relation, whereby said pair of oppositely oriented wedge members are forcibly positioned in a direction axially of the rotor assembly to bias the permanent magnets radially outwardly toward the containment shell.

7. In a dynamoelectric machine of the permanent magnet type, a rotor assembly comprising:

a hub having a plurality of annularly spaced, radially outwardly opening slots, at least one said slot bounded by a bottom and circumferentially spaced sidewalls, said sidewalls converging over only a portion of the radial extent thereof;

a plurality of permanent magnets respectively disposed in the slots;

a containment shell surrounding the hub; and wedge means between a base of each permanent magnet and a bottom of its respective slot for loading the permanent magnets only in a direction radially outwardly toward the containment shell, said wedge means comprising at least one wedge-shaped member with oppositely facing surfaces for engaging the bottom and a magnet in the one slot, the wedge-shaped member being solid between its oppositely facing surfaces to allow a positive outward force to be exerted on the magnet in the one slot by forcibly directing the wedge-shaped member between the bottom of the one slot and the magnet in the one slot.

8. In a dynamoelectric machine as set forth in claim 7, wherein said wedge means comprise at least one wedge-shaped member having spaced-apart ends with different thicknesses, whereby said wedge member is forcibly positioned in a direction axially of the rotor assembly to bias the permanent magnets radially outwardly toward the containment shell.

9. In a dynamoelectric machine as set forth in claim 7, wherein said wedge means comprise at least a pair of wedge-shaped members having spaced-apart ends with different thicknesses, each of said pair of wedge-shaped members arranged in opposite juxtaposed relation, whereby said pair of oppositely oriented wedge members are forcibly positioned in a direction axially of the rotor assembly to bias the permanent magnets radially outwardly toward the containment shell.

* * * * *